US008004815B2

(12) United States Patent
Loche et al.

(10) Patent No.: US 8,004,815 B2
(45) Date of Patent: Aug. 23, 2011

(54) LIGHTNING PROTECTION SYSTEM AND AN AIRCRAFT HAVING SUCH A SYSTEM

(75) Inventors: Jean-Christophe Loche, Gratentour (FR); Francois Guillaumel, Toulouse (FR); Lionnel Espagnan, Toulouse (FR); Jean-Claude Marty, Grepiac (FR)

(73) Assignee: Airbus France, Toulouse (FR)

( * ) Notice: Subject to any disclaimer, the term of this patent is extended or adjusted under 35 U.S.C. 154(b) by 237 days.

(21) Appl. No.: 12/331,975

(22) Filed: Dec. 10, 2008

(65) Prior Publication Data

US 2009/0159306 A1  Jun. 25, 2009

(30) Foreign Application Priority Data

Dec. 11, 2007 (FR) ...................... 07 59738

(51) Int. Cl.
*H02H 1/00* (2006.01)

(52) U.S. Cl. ...................... 361/218; 361/117

(58) Field of Classification Search .......... 361/117–120, 361/218
See application file for complete search history.

(56) References Cited

U.S. PATENT DOCUMENTS

| 4,380,039 A * | 4/1983 | King ............................. 361/218 |
| 4,755,904 A * | 7/1988 | Brick ............................ 361/117 |
| 7,236,343 B2 * | 6/2007 | Heidlebaugh et al. ........ 361/218 |
| 2005/0213278 A1 | 9/2005 | Hawley |

FOREIGN PATENT DOCUMENTS

| FR | 1258691 A | 4/1961 |
| FR | 1493575 A | 9/1967 |
| FR | 2765066 A | 12/1998 |
| WO | 2005026538 A | 3/2005 |

OTHER PUBLICATIONS

French Search Report dated Jun. 24, 2008.

* cited by examiner

*Primary Examiner* — Danny Nguyen
(74) *Attorney, Agent, or Firm* — Perman & Green, LLP

(57) ABSTRACT

A lightning protection system for a composite structure has an outer surface designed to be subject to an air flow. This system has an electrically conductive strip and fasteners from the strip to the structure.
Since the structure has holes designed for the fasteners, at least some of these fasteners have an attachment element from the lightning to this structure. This attachment element is inserted into the hole with its top part approximately even with the outer surface of this structure, and the attachment element is in electrical contact with the electrically conductive strip. At least part of the electrically conductive strip is placed within the thickness of the structure and to be connected to the ground.

13 Claims, 2 Drawing Sheets

ART ANTERIEUR

ART ANTERIEUR

LIGHTNING PROTECTION SYSTEM AND AN AIRCRAFT HAVING SUCH A SYSTEM

CROSS-REFERENCE TO RELATED APPLICATIONS

This application claims priority to French Application No. 07 59738, filed on 11 Dec. 2007, the disclosure of which is incorporated herein by reference in its entirety.

BACKGROUND

1. Field

The disclosed embodiments concern a lightning protection system for a composite structure, particularly panels with a light central core, such as a honeycomb core. It is specially adapted for lightning protection on a radome or aircraft fuselage.

2. Brief Description of Related Developments

Sandwich structures made of composite material have exceptional properties, especially mechanical ones. They combine high resistance to mechanical and/or thermal stresses with strong rigidity at minimal weight.

These structures are therefore widely used in the space industry (satellites, probes, launchers) and in the aeronautics industry (radomes, hatches, leading edges, ailerons, etc. . . . ).

However, it is known that these structures are vulnerable to lightning strikes if they are not properly connected to the ground. High-density electric currents passing through these composite structures can severely damage them and result in delamination, for example. The case of the radome is even more critical, since, by definition, it cannot have the traditional devices to carry the lightning current, such as a metal grill inserted in the surface of the structure, because radar waves require transparency.

There are known means of dissipating the energy from lightning to protect these structures in the event of a lightning strike.

FIG. 1 shows such a means of dissipating the energy from lightning from the prior art. Lightning-protection strips 1, typically made of aluminum or copper, are located on the outer surface 2 of an aircraft radome 3. These strips 1 are attached to the radome by screw-type fasteners 4. Each lightning-protection strip 1 is electrically connected to the outer surface 2 of the radome 3, so the electrostatic charges that accumulate there can flow off. Part 5, into which the screw 4 to attach the strip 1 fits, is made of insulating plastic.

Each strip 1 is also connected to the junction of the aircraft fuselage to make sure it is individually grounded. Thus, a lightning bolt that strikes this strip 1 has its energy diverted to the ground without affecting any other part of the radome.

Although this means of dissipating energy gives good results, interference 6 with the incident air flow 7 on the radome 3 has been observed; it is caused by the projections formed by the lightning-protection strips 1 on the outer surface 2 of the radome (FIG. 1b).

When the radome forms the "nose" of an airplane, it is generally conical in shape to give the aircraft good air penetration and aerodynamics.

This aerodynamic interference 6 generates increased drag, particularly by triggering a transition from laminar to turbulent flow, and it also substantially increases the aircraft's fuel consumption, which is incompatible with the economics of the airline companies.

When lightning strikes a lightning-protection strip hard, it is possible for it to be damaged, for example when there is superficial melting of the screw attached to the strip. During radome maintenance, it must then be taken out to remove and replace the damaged strip.

It would therefore be of interest to have a system to protect the radome of an aircraft from lightning that would also make it possible to reduce drag, gain fuel weight and be as transparent to radar waves as possible.

SUMMARY

The aspects of the disclosed embodiments propose a lightning-protection system with a composite structure which has an outer surface subject to an air flow, which is simple in design and operating mode and which makes it possible to ensure total dissipation of the energy from a lightning strike without damaging the structure and without disturbing the air flow near that part.

To this end, one aspect of the disclosed embodiments concerns a lightning-protection system for a composite structure that has an outer surface designed to be subject to an air flow, with said system having at least one electrically conductive strip and fasteners from this strip to said structure.

According to the aspects of the disclosed embodiments, the structure has holes designed to hold the fasteners, and at least some of these fasteners have an attachment element from the lightning to the structure, the attachment element is designed to be inserted into the hole by having its top part approximately even with the outer surface of the structure, with the attachment element in electrical contact with the electrically conductive strip, and at least one part of the electrically conductive strip is designed to be placed within the thickness of the structure and to be connected to the ground.

The phrase "top part approximately even with the outer surface of the structure," means that this top part is level with the outer surface of the structure, i.e., that the upper end of the attachment element is level or contiguous with the outer surface of the structure to within the assembly tolerances.

This system can be used advantageously on any type of composite structure, whether monolithic, simple sandwich or multi-sandwich.

In different aspects of the disclosed embodiments of this lightning-protection system, each having its special advantages and capable of many potential technical combinations:

the attachment element from the lightning to the structure is a one-piece conductive pad whose lower part has a threaded rod part designed to pass through a perforation in the strip.

Since the electrically conductive strip has a thickness e and a width l, the section of threaded rod can be at least equal to l×e. Preferably, this section of threaded rod will be equal to the section of the electrically conductive strip. The diameter of the threaded rod is 6.35 mm at the minimum, so as to conduct the lightning current effectively.

the system has a tube with a longitudinal axis that is designed to be built into the thickness of the composite structure to hold the electrically conductive strip in such a way as to insulate it electrically and strengthen the mechanical behavior of the composite structure.

Since this tube is a composite tube, it is typically inserted in the lay-up and is co-fired with the composite structure.

Advantageously, the materials and processes used to manufacture these tubes will make it possible to:

do as little as possible to hurt the radio-frequency performance of the radome when it includes the composite structures in the invention, provide electrical insulation for the electrically conductive strip vis-a-vis the radar antenna that protects this radome keep the mechanical performance equivalent to a traditional sandwich structure when the composite structure is equipped with such a lightning-protection system.

the tube is a composite section having fibers chosen from the group that includes glass fibers, quartz fibers and combinations of these elements, so as to generate little radio-frequency interference.

These fibers have the advantage of having a coefficient of reflection of radio-frequency waves that is lower than other materials, such as metallic structures, so as to do as little as possible to hurt the radio-frequency performance of a radome.

the system has electrically conductive chips designed to be placed in housings on the outer surface of the structure; these housings are approximately aligned and may or may not be spaced regularly between two consecutive fasteners to make it easier to scan the lightning arc between attachment elements from the lightning to the structure, the system has a metallic grill designed to be built into the thickness of the wall delimiting the outer surface of said structure; this grill is then designed to be in electrical contact with the lightning attachment elements.

Another aspect of the disclosed embodiments concerns a composite structure having an outer surface designed to be subjected to an air flow. According to the disclosed embodiments, this composite structure is equipped with a lightning-protection system, as previously described, and the outer surface of this composite structure, with which the upper part of said attachment element is placed almost level, is non-metallic.

Consequently, this composite structure has at least one electrically conductive strip and fasteners from this strip to the structure, which fit into holes in the composite structure. At least some of these fasteners have an attachment element from the lightning to the structure; this attachment element is inserted into a corresponding hole with its top part approximately level with the outer surface of the structure. This attachment element is also in electrical contact with the electrically conductive strip, which is, at least in part, placed within the thickness of this composite structure and connected to the ground.

The phrase "top part approximately even with the outer surface of the structure," means that this top part is level with the outer surface of the structure, i.e., that the top end of the attachment element is level with or contiguous with the outer surface of the structure to within the assembly tolerances.

In different aspects of the disclosed embodiments of this composite structure, each having its special advantages and each capable of many potential technical combinations:

the attachment elements of this electrically conductive strip are arranged in the form of a strip, the attachment elements are aligned approximately and spaced, regularly or not.

This alignment of the attachment elements is an advantage in that it makes it possible to limit the surface of the elements that could form a radio-frequency barrier to radar waves for a radome equipped with such a lightning-protection system.

this structure is monolithic or has at least two walls placed on opposite outer sides of a core, respectively, the composite structure has electrically conductive chips placed in housings on the outer surface of this structure; these housings are aligned approximately and spaced, regularly or not, between two consecutive fasteners to make it easier to scan the lightning arc between the lightning/structure attachment elements, the structure is made of an insulating material and has only said lightning attachment elements, said electrically conductive strip and potentially said chips as conductive elements.

Thus, when the composite structure is struck by lightning, the current moves along the surface without going through this structure until it meets up with the closest attachment elements and the electrically conductive strip associated with them. This limits to the maximum the presence of elements that can form a radiofrequency barrier to radar waves.

this composite structure includes a tube with a longitudinal axis built into the thickness of the structure that holds the electrically conductive strip to insulate it electrically and strengthen the mechanical behavior of the composite structure.

the tube is a composite section with fibers chosen from the group that includes glass fibers, quartz fibers and combinations of those elements, so as to generate little radio-frequency interference.

A further aspect of the disclosed embodiments concerns a panel that has at least one monolithic composite structure, as previously described.

"Monolithic" is taken to mean a sheet or plate with one ply or several plies combined or joined directly to one another, without interposing a light core, such as alveolar material, as in the case of the sandwich structure.

In one aspect, this monolithic composite panel has a first skin forming the outer wall of the panel and a second skin forming the inner part of the panel. The skins that make up the panel are composed of composite materials, for example.

Another aspect of the disclosed embodiments concerns a panel that has at least two walls located, respectively, on opposite outer faces of a core equipped with a lightning-protection system, as described previously.

The core can be made of an alveolar material, such as honeycomb or foam. Preferably, the panel, with its monolithic, sandwich or multisandwich composite structure, has a tube with a longitudinal axis in its thickness. This tube serves as a housing for at least one part of the electrically conductive strip to insulate it electrically and strengthen the mechanical behavior of the composite structure.

As a purely illustrative example, in the case of a sandwich structure, the tube can be placed between the walls located on either side of the core, in a recess in the core. The tube is then integral with these walls and the core. For example, it is inserted in the draping and co-fired with the composite structure when it is manufactured.

The disclosed embodiments concern a radome equipped with at least one panel, as described previously.

Preferably, the position of the electrically conductive strip in the direction of the panel width may vary from one panel to another, and the lightning-protection strips on the radome are spaced so they do as little as possible to hurt its radiofrequency performance.

Lastly, the disclosed embodiments concern an aircraft equipped with at least one panel, as described previously.

As an illustration, this panel can be part of the fairing of the aircraft or radome.

BRIEF DESCRIPTION OF THE DRAWINGS

The aspects of the disclosed embodiments will be described in greater detail with reference to the attached drawings in which.

DETAILED DESCRIPTION OF THE DISCLOSED EMBODIMENTS

Figure 1A:
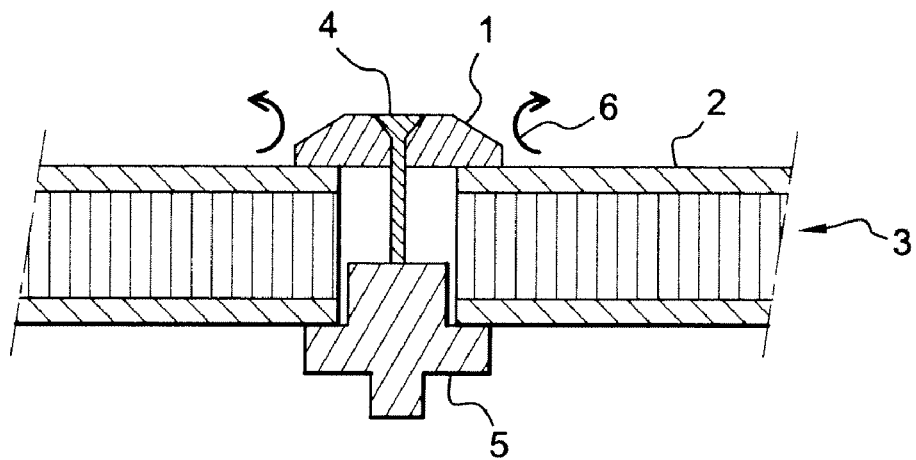
FIG. 1 shows an example from the prior art of means of dissipating the energy from lightning mounted on the panel of a radome, with FIG. 1a) showing a sectional view of this panel and FIG. 1b) a partial perspective view of this panel diagramming the air flows on its surface.
Figure 1B:
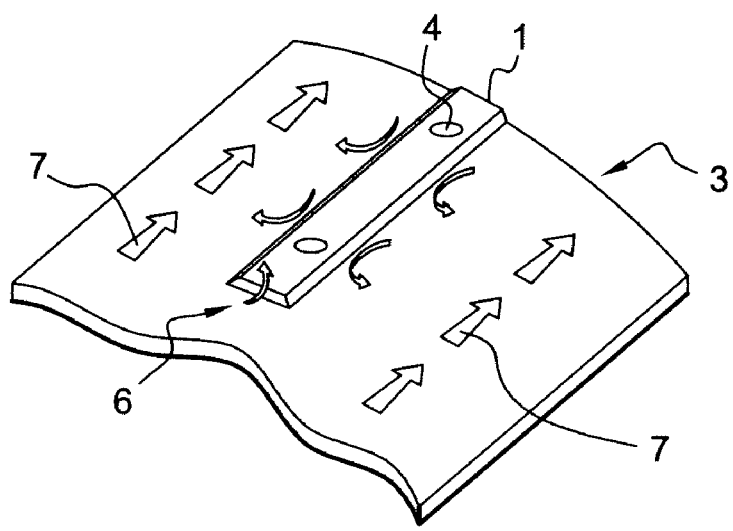
Figure 2:
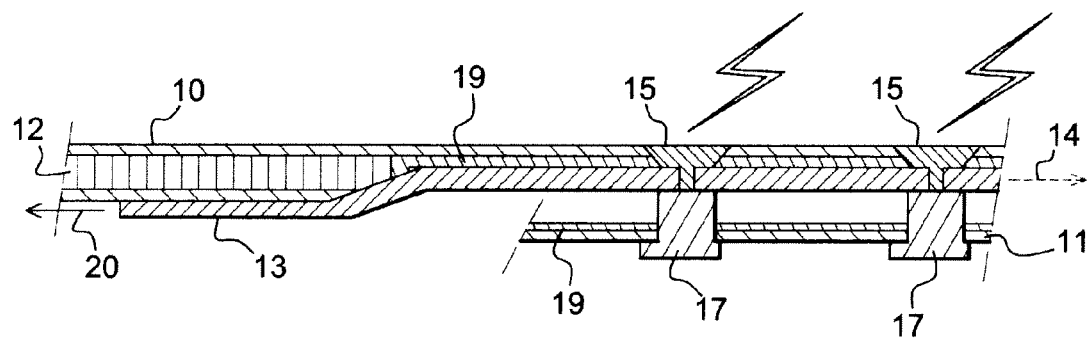
FIG. 2 is a schematic representation in longitudinal section of a panel equipped with a lightning-protection system, according an aspect of the disclosed embodiments.
Figure 3:
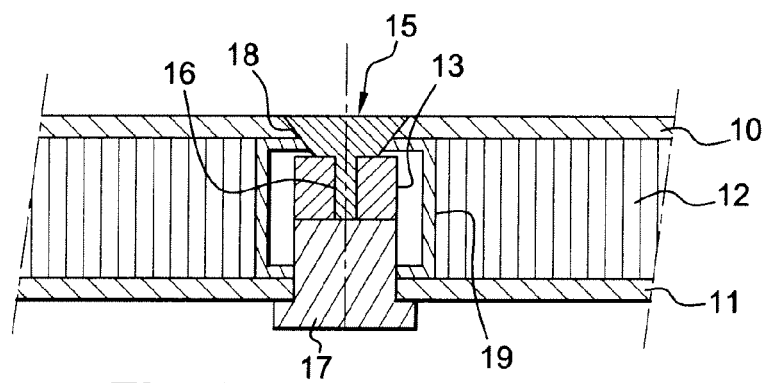
FIG. 3 is a transverse sectional view of the panel in FIG. 2.

FIGS. 2 and 3 show a panel equipped with a lightning-protection system according to one aspect of the disclosed embodiments. The panel has a sandwich core structure with two walls 10, 11 located on opposite outer faces of a honeycomb core 12, respectively.

These walls 10, 11 are composite armatures. The composites can be chosen from the group, given as a non-limiting example, that includes glass composites, silica composites, silicone carbide composites, quartz composites, basalt composites, aramid fibers or any other composite that has the appropriate dielectric properties.

The honeycomb core 12 is made of aramid, for example. Aramid fibers are actually not very flammable, are highly resistant to breakage and have a high modulus of elasticity.

This panel is a constituent part of a radome, and its upper wall 10, called the outer wall, is designed to be exposed to an air flow.

The panel is equipped with a lightning-protection system that has an electrically conductive strip 13 with a longitudinal axis 14 and fasteners from this strip 13 to the panel.

There are two criteria for the section with the electrically conductive strips 13, namely the choice of material used and the impact of the presence of these strips on radiofrequency performance. As a purely illustrative example, the minimum state of the art required for the current from the lightning to pass into the strip is 20 mm² for copper strips and 30 mm² for aluminum strips.

The fasteners each have an attachment element 15 from the lightning to the panel inserted in a recess that opens out and is provided for that purpose in the thickness of the panel.

The attachment element 15 from the lightning to the panel here is a one-piece conductive pad that has a threaded rod portion on the bottom. This threaded rod portion is designed to go through a perforation in the electrically conductive strip 13, so that a screw 17, which is one of the fasteners and supports the opposite face of this strip, assures its attachment.

This screw 17 can be made of insulating plastic, such as acetal resin or polycarbonate. The acetal resin Delrin® sold by Dupont de Nemours is particularly well suited for this invention. The screw 17 helps electrically insulate the electrically conductive strip 13, or lightning-protection strip, of the radar antenna that protects the radome.

Each conductive pad 15 has an intermediate cylindrical portion 16 connecting the bottom part to the top part 18. This top part 18 is shaped like an inverted cone, so that the base of this tapered part forms the top outer surface of the conductive pad.

The conductive pads 15 fastening the electrically conductive strip 13 are preferably placed along its longitudinal axis 14. The conductive pads 15 can be made of a metallic material chosen from the group that includes copper, stainless steel and aluminum.

The panel also has a composite tube 19 that serves as a housing for part of the electrically conductive strip 13. This composite tube 19, which is placed in the thickness of the panel, has perforations in it to allow part of the body of the attachment elements to pass from the lightning 15 to the panel and to connect the electrically conductive strip 13 to these elements with insulating screws 17.

The composite tube 19 is placed between the walls 10, 11 in a recess made in the core 12 and is then cofired with the sandwich structure forming the panel to make sure it is joined to said walls 10, 11 and to the core 12.

A portion of the electrically conductive strip 13 comes out of the panel on the opposite side on the surface of the panel 10 designed to be exposed to an air flow. This portion is designed to be grounded by being connected 20, for example, to the base of the radome on the fuselage of the aircraft.

The electrically conductive strip 13 is therefore placed inside the radome and no longer disturbs the air flow on the outer surface 10 of the panel. The conductive pad 15 is placed in the hole on the panel so that its top part 18 is flush with the outer wall 10 of the panel, that is, this top outer surface is level with the outer surface 10 of the panel. Consequently, an incident air flow on the panel "sees" only a substantially uniform surface, and this flow can thus remain laminar.

Figure 4:
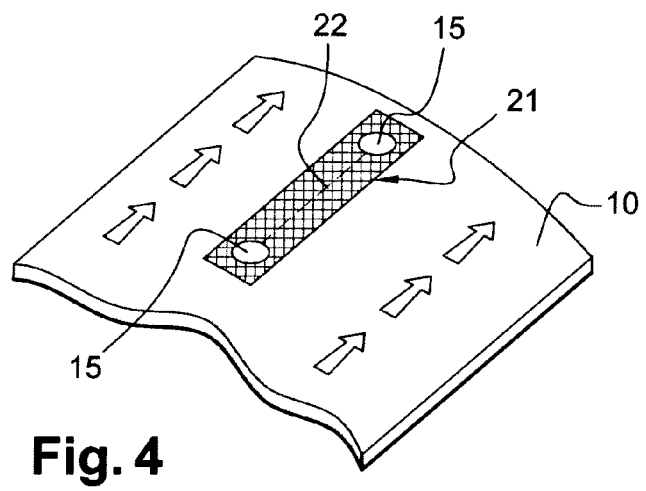
FIG. 4 is a schematic representation of a panel equipped with an exemplary lightning-protection system, according to one aspect of the disclosed embodiments.

FIG. 4 is a partial perspective view of a panel equipped with a lightning-protection system according to a second embodiment of the invention. The elements with the same reference numbers and letters as those in FIGS. 2 and 3 represent the same objects. The panel in FIG. 5 is distinguished from the one in FIGS. 2 and 3 in that the wall 10 delimiting the outer surface of the panel has a metallic grill 21 in its thickness. This grill 21 is in electrical contact with the attachment elements 15 from the lightning to the panel.

Typically, since the skin 10 has a series of plies, the metal grill 21 is placed under the first outer ply of this skin extending longitudinally along the electrically conductive strip 13. This grill 21 can be made of bronze.

The lightning-protection system can also be comprised of a strip of chips 22 including a juxtaposition of electrically conductive chips, such as metallic chips, with small dimensions, typically 5 mm in diameter, aligned and spaced with a small gap, currently 1 to 3 mm. This strip of chips 22 placed between two attachment elements 15 from the lightning to the panel, makes it possible to guide the lightning arc by ionizing the air between each chip between the attachment elements from the lightning 15 to the panel. FIG. 4 shows a lightning-protection system equipped with a single strip of chips 22, but it could of course have more.

What is claimed is:

1. A lightning protection system for a composite structure comprising an outer surface designed to be subject to an air flow; said system comprising at least one electrically conductive strip and fasteners from said strip to said structure, wherein:

said structure comprises holes designed for such fasteners;
        at least some of said fasteners comprising an attachment element being protected from the lightning to said structure, said attachment element is designed to be inserted into said hole with its top part approximately level with the outer surface of said structure, and with said attachment element in electrical contact with said electrically conductive strip, and at least one part of said electrically conductive strip is designed to be placed within the thickness of said structure and to be connected to the ground, wherein the lighting protection system further comprises a tube with a longitudinal axis that is designed to be built into the thickness of said composite structure to hold said electrically conductive strip in such a way as to electrically insulate it and strengthen the mechanical behavior of said composite structure.

2. The system as claimed in claim 1, further comprising that said attachment element from the lightning to said structure is a one-piece conductive pad comprising a threaded rod portion on the bottom, and said portion is designed to go through a perforation in said strip.

3. The system as claimed claim 1, further comprising that said tube is a composite section composed of fibers chosen from the group that includes glass fibers, quartz fibers and combinations of these elements, so as not to generate much radiofrequency interference.

4. The system as claimed in claim 1 further comprising electrically conductive chips designed to be placed in housings on the outer surface of said structure, with said housings approximately aligned and spaced, regularly or not, between two consecutive fasteners to make it easier to scan the lightning arc between said attachment elements from the lightning to said structure.

5. The system as claimed in claim 1, further comprising a metal grill designed to be built into the thickness of the wall delimiting the outer surface of said structure; the grill is configured to be in electrical contact with said lightning attachment elements.

6. A composite structure comprising an outer surface designed to be subject to an air flow, wherein said composite structure is equipped with a lightning-protection system comprising at least one electrically conductive strip and fasteners from said strip to said structure, wherein:

said structure comprises holes designed for such fasteners;
at least some of said fasteners comprising an attachment element being protected from the lightning to said structure,
said attachment element is designed to be inserted into said hole with its top part approximately level with the outer surface of said structure, and with said attachment element in electrical contact with said electrically conductive strip, and
at least one part of said electrically conductive strip is designed to be placed within the thickness of said structure and to be connected to the ground,
wherein the lighting protection system further comprises a tube with a longitudinal axis that is designed to be built into the thickness of said composite structure to hold said electrically conductive strip in such a way as to electrically insulate it and strengthen the mechanical behavior of said composite structure; and wherein the outer surface of said composite structure with which the top part of said attachment element is approximately even is non-metallic.

7. The structure as claimed in claim 6, further comprising that said attachment elements of said electrically conductive strip are arranged in the form of a strip.

8. The structure as claimed in claim 6, further comprising that said attachment elements are approximately aligned and are spaced, regularly or not.

9. The structure as claimed in claim 6, further comprising that said structure is monolithic or has at least two walls arranged on opposite outer faces of a core, respectively.

10. The structure as claimed in claim 6, further comprising that said structure is made of an insulating material and that it has only said lightning attachment elements, said electrically conductive strip and potentially said chips as conductive elements.

11. A panel comprising at least one composite structure, the at least one composite structure comprising an outer surface designed to be subject to an air flow, wherein said composite structure is equipped with a lightning-protection system comprising at least one electrically conductive strip and fasteners from said strip to said structure, wherein:

said structure comprises holes designed for such fasteners;
at least some of said fasteners comprising an attachment element being protected from the lightning to said structure,
said attachment element is designed to be inserted into said hole with its top part approximately level with the outer surface of said structure, and with said attachment element in electrical contact with said electrically conductive strip, and
at least one part of said electrically conductive strip is designed to be placed within the thickness of said structure and to be connected to the ground,
wherein the lighting protection system further comprises a tube with a longitudinal axis that is designed to be built into the thickness of said composite structure to hold said electrically conductive strip in such a way as to electrically insulate it and strengthen the mechanical behavior of said composite structure; and wherein the outer surface of said composite structure with which the top part of said attachment element is approximately even is non-metallic.

12. A radome comprising at least one panel comprising at least one composite structure, the at least one composite structure comprising an outer surface designed to be subject to an air flow, wherein said composite structure is equipped with a lightning-protection system comprising at least one electrically conductive strip and fasteners from said strip to said structure, wherein:

said structure comprises holes designed for such fasteners;
at least some of said fasteners comprising an attachment element being protected from the lightning to said structure,
said attachment element is designed to be inserted into said hole with its top part approximately level with the outer surface of said structure, and with said attachment element in electrical contact with said electrically conductive strip, and
at least one part of said electrically conductive strip is designed to be placed within the thickness of said structure and to be connected to the ground,
wherein the lighting protection system further comprises a tube with a longitudinal axis that is designed to be built into the thickness of said composite structure to hold said electrically conductive strip in such a way as to electrically insulate it and strengthen the mechanical behavior of said composite structure; and wherein the outer surface of said composite structure with which the top part of said attachment element is approximately even is non-metallic.

13. An aircraft comprising at least one panel comprising at least one composite structure comprising an outer surface designed to be subject to an air flow, wherein said composite structure is equipped with a lightning-protection system comprising at least one electrically conductive strip and fasteners from said strip to said structure, wherein:

said structure comprises holes designed for such fasteners;

at least some of said fasteners comprising an attachment element being protected from the lightning to said structure, said attachment element is designed to be inserted into said hole with its top part approximately level with the outer surface of said structure, and with said attachment element in electrical contact with said electrically conductive strip, and at least one part of said electrically conductive strip is designed to be placed within the thickness of said structure and to be connected to the ground, wherein the lighting protection system further comprises a tube with a longitudinal axis that is designed to be built into the thickness of said composite structure to hold said electrically conductive strip in such a way as to electrically insulate it and strengthen the mechanical behavior of said composite structure; and wherein the outer surface of said composite structure with which the top part of said attachment element is approximately even is non-metallic.

\* \* \* \* \*

UNITED STATES PATENT AND TRADEMARK OFFICE
CERTIFICATE OF CORRECTION

| | | |
|---|---|---|
| PATENT NO. | : 8,004,815 B2 | Page 1 of 1 |
| APPLICATION NO. | : 12/331975 | |
| DATED | : August 23, 2011 | |
| INVENTOR(S) | : Jean-Christophe Loche et al. | |

It is certified that error appears in the above-identified patent and that said Letters Patent is hereby corrected as shown below:

Column 7, line 21, Claim 3, after the word "claimed" insert -- in --, therefor.

Signed and Sealed this
Third Day of January, 2012

David J. Kappos
*Director of the United States Patent and Trademark Office*